United States Patent
Brunello et al.

(10) Patent No.: US 9,643,875 B2
(45) Date of Patent: May 9, 2017

(54) FUSION DRAW APPARATUS AND METHODS (75) Inventors: Pierre Brunello, Villecerf (FR); Allan Mark Fredholm, Vulaines sur Seine (FR); Claude Francois Maurice Gille, Bougligny (FR); Kamel Madi, Botley (GB); Xavier Tellier, Cheroy (FR)

(73) Assignee: Corning Incorporated, Corning, NY (US)

( * ) Notice: Subject to any disclaimer, the term of this patent is extended or adjusted under 35 U.S.C. 154(b) by 571 days.

(21) Appl. No.: 14/000,757

(22) PCT Filed: Feb. 24, 2012

(86) PCT No.: PCT/US2012/026512
§ 371 (c)(1),
(2), (4) Date: Sep. 23, 2013

(87) PCT Pub. No.: WO2012/158232
PCT Pub. Date: Nov. 22, 2012

(65) Prior Publication Data
US 2014/0216107 A1 Aug. 7, 2014

Related U.S. Application Data (60) Provisional application No. 61/447,235, filed on Feb. 28, 2011.

(51) Int. Cl.
*C03B 17/06* (2006.01)
*C03B 21/02* (2006.01)
*C03B 33/02* (2006.01)

(52) U.S. Cl.
CPC .......... *C03B 17/068* (2013.01); *C03B 17/064* (2013.01); *C03B 21/02* (2013.01); *C03B 33/0215* (2013.01)

(58) Field of Classification Search
CPC ....... C03B 17/064; C03B 17/068; C03B 7/10; C03B 21/02; C03B 21/06; C03B 33/0215
(Continued)

(56) References Cited

U.S. PATENT DOCUMENTS 1,836,363 A 12/1931 Drake
2,243,149 A * 5/1941 Despret .................. C03B 21/02
65/182.2
(Continued)

FOREIGN PATENT DOCUMENTS

FR 2567872 1/1986
WO 2006/121709 A1 11/2006
(Continued)

OTHER PUBLICATIONS

Taiwan Office Action, dated Nov. 25, 2015, pp. 1-5, Taiwan Application No. 101156055, The Taiwan Intellectual Property Office, Taiwan.
(Continued)

*Primary Examiner* — Joseph S Del Sole
*Assistant Examiner* — Mohamed K Ahmed Ali (57) ABSTRACT

A fusion draw apparatus includes a pair of engagement rollers. At least one of the pair of engagement rollers includes a circumferential knife edge configured to cooperate with the other of the pair of engagement rollers to thin the edge portion or sever the edge portion from a central portion of the glass ribbon within the viscous zone of the glass ribbon. In further examples, fusion draw methods include the step of thinning the edge portion or severing the edge portion from the central portion of the glass ribbon within the viscous zone.

9 Claims, 9 Drawing Sheets

(58) Field of Classification Search
USPC ..................................................... 65/53, 176
See application file for complete search history.

(56) References Cited

U.S. PATENT DOCUMENTS

| | | | |
|---|---|---|---|
| 3,124,444 A | 3/1964 | Ritter et al. | |
| 3,338,696 A | 8/1967 | Dockerty | |
| 3,451,798 A | 6/1969 | Simon | |
| 3,537,834 A | 11/1970 | Simon | |
| 4,466,562 A | 8/1984 | DeTorre | 225/2 |
| 4,749,400 A | 6/1988 | Mouly et al. | 65/97 |
| 4,828,900 A | 5/1989 | Mouly | 428/192 |
| 4,891,054 A | 1/1990 | Bricker et al. | 65/105 |
| 2006/0242994 A1 | 11/2006 | Boratav et al. | |
| 2007/0140311 A1 | 6/2007 | House et al. | 374/100 |
| 2008/0066498 A1 | 3/2008 | Markham et al. | 65/29.16 |
| 2009/0100873 A1 | 4/2009 | Allan et al. | 65/85 |
| 2010/0126226 A1 | 5/2010 | Zhou et al. | 65/158 |
| 2010/0218557 A1 | 9/2010 | Aniolek et al. | |
| 2010/0269545 A1 | 10/2010 | Boratav et al. | |
| 2010/0294748 A1* | 11/2010 | Garner | C03B 33/0215 219/121.72 |

FOREIGN PATENT DOCUMENTS

| | | |
|---|---|---|
| WO | 2010/099304 A2 | 9/2010 |
| WO | 2010141832 | 12/2010 |
| WO | 2012158232 | 11/2012 |

OTHER PUBLICATIONS

CN201280010649.0 First Office Action Dated Mar. 24, 2015.
International Search Report of the International Searching Authority; PCT/US2012/026512; Mailed Dec. 10, 2012.
JP2013556776 Grounds for Rejection Dated Jan. 16, 2016.
Pilkington; "Review Lecture: The Float Glass Process"; Proc. Roy. Soc. Lond. A. 314, 1-25 (1969).

* cited by examiner

FUSION DRAW APPARATUS AND METHODS

CROSS-REFERENCE TO RELATED APPLICATIONS

This application claims the benefit of priority under 35 U.S.C. §371 of International Application PCT/US2012/026512 filed on Feb. 24, 2012, which, in turn, claims the benefit of priority under 35 U.S.C. §119 of U.S. Provisional Application Ser. No. 61/447,235, filed on Feb. 28, 2011, the content of which is relied on and incorporated herein by reference in its entirety.

TECHNICAL FIELD

The present invention relates generally to apparatus and methods for fusion drawing a glass ribbon, and more particularly, to apparatus and methods for fusion drawing a glass ribbon and removing edge portions of the glass ribbon.

BACKGROUND

Glass manufacturing apparatus are commonly used to form various glass products such as LCD sheet glass. It is known to manufacture sheet glass by downwardly flowing molten glass over a forming wedge and using edge rollers to engage beads formed at opposite end portions of a glass ribbon.

SUMMARY

The following presents a simplified summary of the disclosure in order to provide a basic understanding of some example aspects described in the detailed description.

In one example aspect a fusion draw method comprises the step of flowing molten glass over a pair of downwardly inclined forming surface portions of a forming wedge, the downwardly inclined forming surface portions converging along a downstream direction to form a root. The method further includes the step of drawing a glass ribbon from the root, into a viscous zone wherein the glass ribbon has a pair of opposed edge portions and a central portion laterally spanning between the opposed edge portions, and an outer end of each opposed edge portion including an edge bead with a thickness that is greater than a thickness of the central portion. The method further includes the step of severing the edge portions from the central portion within the viscous zone. The method then includes the step of drawing the central portion of the glass ribbon from the viscous zone into a setting zone. The method then includes the step of drawing the central portion of the glass ribbon from the setting zone to an elastic zone.

In accordance with one embodiment of the aspect, the edge portions are severed from the central portion with at least one corresponding engagement roller associated with each edge portion.

In accordance with another embodiment of the aspect, the edge portions are each severed from the central portion with a corresponding pair of engagement rollers associated with each edge portion.

In accordance with yet another embodiment of the aspect, at least one of the pair of engagement rollers includes a circumferential knife edge that severs the corresponding edge portion from the central portion.

In accordance with another embodiment of the aspect, each of the pair of engagement rollers includes a circumferential knife edge that cooperate to sever the corresponding edge portion from the central portion.

In accordance with yet another embodiment of the aspect, the method further comprising the step of working each edge bead with a corresponding pair of edge rollers engaging the respective edge bead within the viscous zone.

In accordance with still another embodiment of the aspect, each of the edge portions are severed from the central portion with at least one corresponding engagement roller that is coaxially aligned along the same rotational axis as the corresponding pair of edge rollers.

In accordance with another embodiment of the aspect, the step of severing and the step of working each edge bead are both conducted at substantially the same downstream distance from the root of the forming wedge.

In accordance with still another embodiment of the aspect, the step of severing is conducted farther downstream from the root than where the corresponding pairs of edge rollers work the corresponding edge beads.

In accordance with yet another embodiment of the aspect, the glass ribbon is drawn by drive rollers engaging the central portion of the glass ribbon in the elastic zone.

In accordance with a further embodiment of the aspect, the central portion of the glass ribbon is coiled into a spool of glass ribbon.

In accordance with another aspect, a fusion draw method comprises the step of flowing molten glass over a pair of downwardly inclined forming surface portions of a forming wedge, the downwardly inclined forming surface portions converging along a downstream direction to form a root. The method further includes the step of drawing a glass ribbon from the root, into a viscous zone wherein the glass ribbon has a pair of opposed edge portions and a central portion laterally spanning between the opposed edge portions, and an outer end of each opposed edge portion including an edge bead with a thickness that is greater than a thickness of the central portion. The method further includes the step of thinning each opposed edge portion within the viscous zone to form a break line extending in the downstream direction and spaced a lateral distance away from the outer end of the corresponding edge portion, wherein a thickness of the glass ribbon at the break line is less than the thickness of the central portion of the glass ribbon. The method then includes the step of drawing the glass ribbon from the viscous zone into a setting zone. The method then includes the step of drawing the glass ribbon from the setting zone to an elastic zone. The method further includes the step of breaking away each opposed edge portion from the central portion at the break line sometime during or after step of drawing the glass ribbon into the setting zone.

In accordance with an example of the aspect, each opposed edge portion is thinned with at least one engagement roller associated with each edge portion.

In accordance with a still another embodiment of the aspect, each opposed edge portion is thinned with a corresponding pair of engagement rollers associated with each edge portion.

In accordance with a yet another embodiment of the aspect, at least one of the pair of engagement rollers includes a circumferential knife edge that thins the corresponding opposed edge portion.

In accordance with a still another embodiment of the aspect, each of the pair of engagement rollers includes a circumferential knife edge that cooperate to thin the corresponding opposed edge portion.

In accordance with still a further embodiment of the aspect, of the pair of engagement rollers includes a first engagement roller with a circumferential knife edge and a second engagement roller with a circumferential groove that cooperates with the circumferential knife edge to thin the corresponding opposed edge portion.

In accordance with another embodiment of the aspect, the method includes the step of working each edge bead with a corresponding pair of edge rollers engaging the respective edge bead within the viscous zone.

In accordance with another embodiment of the aspect, each of the edge portions are thinned with at least one corresponding engagement roller that is coaxially aligned along the same rotational axis as the corresponding pair of edge rollers.

In accordance with a further embodiment of the aspect, the step of thinning and the step of working each edge bead are both conducted at substantially the same downstream distance from the root of the forming wedge.

In accordance with another embodiment of the aspect, step of thinning is conducted farther downstream from the root than where the corresponding pairs of edge rollers work the corresponding edge beads.

In accordance with yet another embodiment of the aspect, the glass ribbon is drawn by drive rollers engaging the central portion of the glass ribbon in the elastic zone.

In accordance with still another example embodiment of the aspect, the central portion of the glass ribbon is coiled into a spool of glass ribbon.

In accordance with another aspect, a fusion draw apparatus comprises a pair of downwardly inclined forming surface portions of a forming wedge. The downwardly inclined forming surface portions converge along a downstream direction to form a root. The fusion draw apparatus further includes a pair of edge rollers configured to work an edge bead of an edge portion of a glass ribbon drawn from the root within a viscous zone of the glass ribbon. The fusion draw apparatus also includes a pair of engagement rollers. At least one of the pair of engagement rollers includes a circumferential knife edge configured to cooperate with the other of the pair of engagement rollers to thin the edge portion or sever the edge portion from a central portion of the glass ribbon within the viscous zone of the glass ribbon. The fusion draw apparatus also includes a pair of drive rollers positioned downstream from the pair of edge rollers and the pair of engagement rollers. The pair of drive rollers are configured to engage the central portion of the glass ribbon within an elastic zone of the glass ribbon to draw the glass ribbon from the root of the forming wedge.

In accordance with an example of the aspect, each engagement roller of the pair of engagement rollers includes a circumferential knife edge configured to cooperate to thin or sever the edge portion.

In accordance with another example of the aspect, the pair of engagement rollers are positioned downstream from the pair of edge rollers.

In accordance with still another example of the aspect, the pair of edge rollers and the pair of engagement rollers are coaxially aligned along the same rotational axis.

In accordance with still another example of the aspect, each of the pair of engagement rollers are coupled to a corresponding one of the pair of edge rollers.

In accordance with a further example of the aspect, a force mechanism is configured to bias the pair of engagement rollers towards one another to facilitate thinning of the edge portion or severing of the edge portion from the central portion.

BRIEF DESCRIPTION OF THE DRAWINGS

These and other aspects are better understood when the following detailed description is read with reference to the accompanying drawings, in which.

DETAILED DESCRIPTION

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Figure 1:
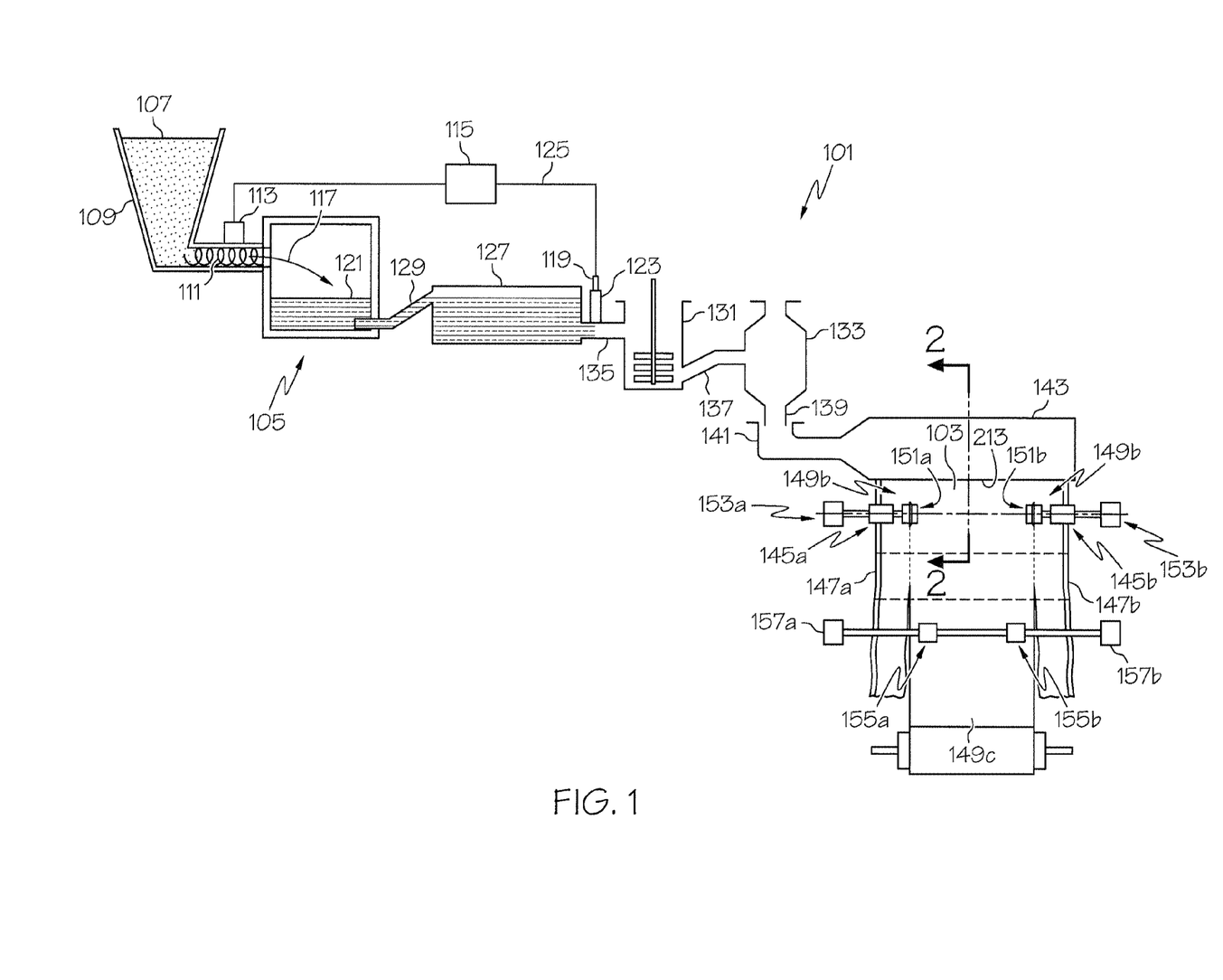
FIG. 1 is a schematic view of an example fusion draw apparatus.

FIG. 1 illustrates a schematic view of a fusion draw apparatus 101 for fusion drawing a glass ribbon 103 for subsequent processing into glass sheets. The fusion draw apparatus 101 can include a melting vessel 105 configured to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by arrow 117. A glass metal probe 119 can be used to measure a glass melt 121 level within a standpipe 123 and communicate the measured information to the controller 115 by way of a communication line 125.

The fusion draw apparatus 101 can also include a fining vessel 127, such as a fining tube, located downstream from the melting vessel 105 and coupled to the melting vessel 105 by way of a first connecting tube 129. A mixing vessel 131 such as a stir chamber, can also be located downstream from the fining vessel 127 and a delivery vessel 133, such as a bowl, may be located downstream from the mixing vessel 131. As shown, a second connecting tube 135 can couple the fining vessel 127 to the mixing vessel 131 and a third connecting tube 137 can couple the mixing vessel 131 to the delivery vessel 133. As further illustrated, a downcomer 139 can be positioned to deliver glass melt 121 from the delivery vessel 133 to an inlet 141 of a forming vessel 143. As shown, the melting vessel 105, fining vessel 127, the mixing vessel 131, delivery vessel 133, and forming vessel 143 are examples of glass melt stations that may be located in series along the fusion draw apparatus 101.

The melting vessel 105 is typically made from a refractory material, such as refractory (e.g. ceramic) brick. The fusion draw apparatus 101 may further include components that are typically made from platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The platinum-containing components can include one or more of the first connecting tube 129, the fining vessel 127 (e.g., finer tube), the second connecting tube 135, the standpipe 123, the mixing vessel 131 (e.g., a stir chamber), the third connecting tube 137, the delivery vessel 133 (e.g., a bowl), the downcomer 139 and the inlet 141. The forming vessel 143 is also made from a refractory material and is designed to form the glass ribbon 103.

Figure 2:
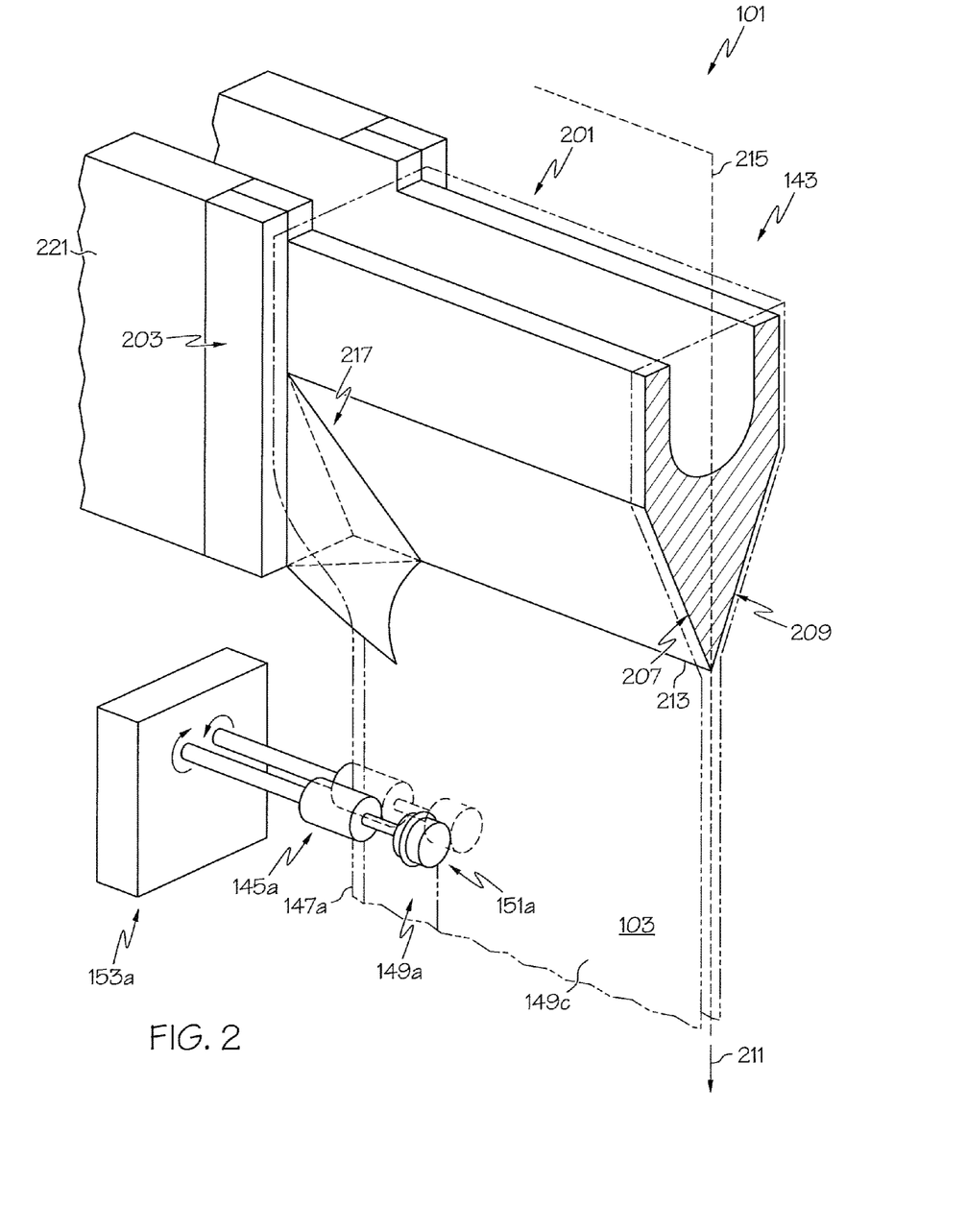
FIG. 2 is an enlarged partial perspective view of the fusion draw apparatus of FIG. 1.

FIG. 2 is a cross-sectional perspective view of the fusion draw apparatus 101 along line 2-2 of FIG. 1. As shown, the forming vessel 143 includes a forming wedge 201 comprising a pair of downwardly inclined forming surface portions 207, 209 extending between opposed ends of the forming wedge 201. The pair of downwardly inclined forming surface portions 207, 209 converge along a downstream direction 211 to form a root 213. A draw plane 215 extends through the root 213 wherein the glass ribbon 103 may be drawn in the downstream direction 211 along the draw plane 215. As shown, the draw plane 215 can bisect the root 213 although the draw plane 215 may extend at other orientations with respect to the root 213.

The forming vessel 143 may optionally comprise one or more edge directors 217 intersecting with at least one of the pair of downwardly inclined forming surface portions 207, 209. In further examples, the one or more edge directors can intersect with both downwardly inclined forming surface portions 207, 209. In further examples, an edge director can be positioned at each of the opposed ends of the forming wedge 201 wherein an edge of the glass ribbon 103 is formed by molten glass flowing off the edge director. For instance, as shown in FIG. 2, the edge director 217 can be positioned at a first opposed end 203 and a second identical edge director (not shown) can be positioned at a second opposed end (not shown). Each edge director can be configured to intersect with both of the downwardly inclined forming surface portions 207, 209. Each edge director 217 can be substantially identical to one another although the edge directors may have different characteristics in further examples. Various forming wedge and edge director configurations may be used in accordance with aspects of the present disclosure. For example, aspects of the present disclosure may be used with forming wedges and edge director configurations disclosed in U.S. Pat. No. 3,451,798, U.S. Pat. No. 3,537,834, U.S. Pat. No. 7,409,839 and/or U.S. Provisional Pat. Application No. 61/155,669, filed Feb. 26, 2009 that are each herein incorporated by reference in its entirety.

Referring to FIGS. 1 and 2, the fusion draw apparatus 101 further comprises a pair of edge rollers 145a configured to work a first edge bead 147a of a first edge portion 149a of the glass ribbon 103 drawn from the root 213 within a viscous zone of the glass ribbon. The edge rollers can work the first edge bead 147a by pressing the edges of the molten glass flowing off of the inclined surface portions 207, 209 together to provide a well formed first edge bead 147a. Likewise, the fusion draw apparatus 101 can further comprise a second pair of edge rollers 145b configured to work a second edge bead 147b of a second edge portion 149b of the glass ribbon 103.

As further illustrated in FIGS. 1 and 2, the fusion draw apparatus 101 can further include a first pair of engagement rollers 151a associated with the first edge bead 147a and a second pair of engagement rollers 151b associated with the second edge bead 147b. One or more motors 153a may be provided to rotate the first pair of edge rollers 145a and/or the first pair of engagement rollers 151a. Likewise one or more motors 153b may be provided to rotate the second pair of edge rollers 145b and/or the second pair of engagement rollers 151b.

As further shown in FIG. 1, the fusion draw apparatus 101 can include a first pair of drive rollers 155a positioned downstream from the first pair of edge rollers 145a and the first pair of engagement rollers 151a. The first pair of drive rollers 155a is configured to engage a central portion 149c within an elastic zone of the glass ribbon to draw the glass ribbon from the root 213 of the forming wedge 201. One or more motors 157a can be provided to drive the first pair of drive rollers 155a. The fusion draw apparatus 101 can further include a second pair of drive rollers 155b positioned downstream from the second pair of edge rollers 145b and the second pair of engagement rollers 151b. The second pair of drive rollers 155b is also configured to engage the central portion 149c within the elastic zone of the glass ribbon to draw the glass ribbon from the root 213 of the forming wedge 201. One or more motors 157b can be provided to drive the second pair of drive rollers 155b.

Figure 3:
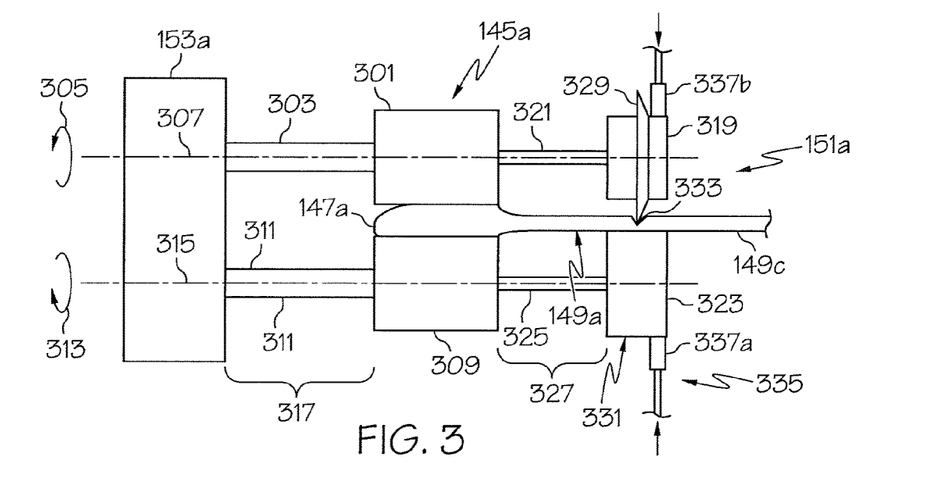
FIG. 3 illustrates one example of a pair of engagement rollers.

FIG. 3 illustrates one example arrangement of the edge rollers and the engagement rollers on according to one example. While one side is illustrated and described with respect to FIG. 3, the opposite side may appear as a mirror image of the first side. As shown, the first pair of edge rollers 145a can include a first edge roller 301 mounted on a first shaft 303 that may be rotated by the motor 153a in a direction 305 about a first rotation axis 307. Likewise, the first pair of edge rollers 145 can include a second edge roller 309 mounted on a second shaft 311 that may be rotated by the motor 153a in a direction 313 about a second rotational axis 315. In one example, the first shaft 303 and the second shaft 311 can substantially rigidly mount the first edge roller 301 and the second edge roller 309 relative to one another within region 317 to allow sufficient pressing of the edge rollers 301, 309 against the first edge bead 147a.

As further shown in FIG. 3, the first pair of engagement rollers 151a can include a first engagement roller 319 that may be mounted by a first flexible coupling 321 to the first edge roller 301. The first flexible coupling 321 may rotate the first engagement roller 319 about the first rotational axis 307. As such, in one example, the first engagement roller 319 can be coaxially aligned with the first edge roller 301 along the same first rotational axis 307. The first pair of engagement rollers 151a can also include a second engagement roller 323 that may be mounted by a second flexible coupling 325 to the second edge roller 309. The second flexible coupling 325 may rotate the second engagement roller 323 about the second rotational axis 315. As such, in one example, the second engagement roller 323 can be coaxially aligned with the second edge roller 309 along the same second rotational axis 315. In one example, the first flexible coupling 321 and the second flexible coupling 325 can substantially flexibly mount the first engagement roller 319 and the second engagement roller 323 relative to one another within a region 327 to allow consistent pressure to be exerted by the engagement rollers 319, 323 as the edge rollers 301, 309 ride over and work the edge bead 147a. The engagement rollers 319, 323 can be driven to run at a speed very similar to the natural speed of the glass ribbon being drawn from the forming wedge. The engagement rollers 319, 323 may rotate that the same speed or at deliberately different speeds.

At least one of the pair of engagement rollers 151a can include a circumferential knife edge. For example, as still further shown in FIG. 3, the first engagement roller 319 includes a circumferential knife edge 329. In addition, or alternatively, the second engagement roller 323 can include a similar knife edge. The circumferential knife edge 329 is configured to cooperate with the other engagement roller to thin the edge portion 149a or sever the edge portion 149a from the central portion 149c of the glass ribbon 103. For example, as shown in FIG. 3, the circumferential knife edge 329 cooperates with a smooth cylindrical surface 331 of the second engagement roller 323 to thin the first edge portion 149a along a break line 333. In alternative examples, sufficient pressure may be applied to completely sever, rather than thin, the glass ribbon.

As shown in FIG. 3, an optional force mechanism 335 may be provided and configured to bias the pair of engagement rollers 151a towards one another to facilitate thinning of the edge portion 149a or severing of the edge portion 149a from the central portion 149c. As shown, the force mechanism 335, if provided may include rollers 337a, 337b that can ride on corresponding circumferential portions of each engagement roller 319, 323 of the pair of engagement rollers 151a. As such, a compression force, in addition to the force applied by the region 327 can further assist in providing the desired combined pressure to facilitate thinning and/or complete severing of the edge portion 149a from the central portion 149c.

Figure 4:
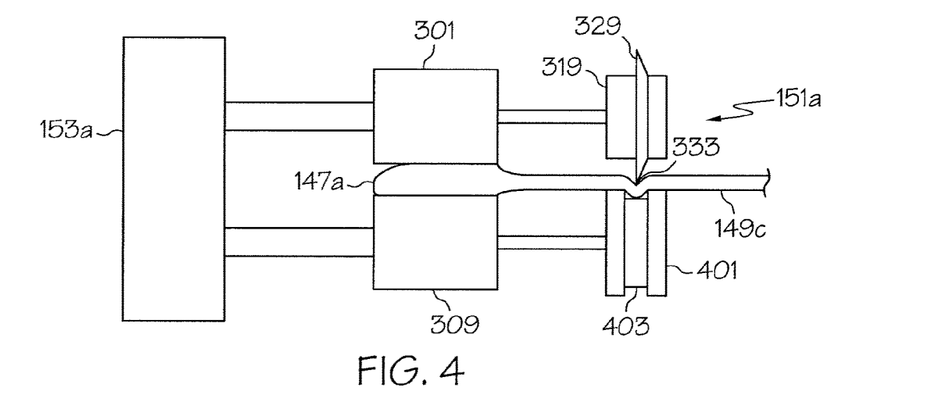
FIG. 4 illustrates another example of a pair of engagement rollers.

FIG. 4 illustrates another example arrangement of the edge rollers and the engagement rollers. While one side is illustrated and described with respect to FIG. 4, the opposite side may appear as a mirror image of the first side. As shown, FIG. 4 is similar or identical to FIG. 3, however, a second engagement roller 401 of the first pair of engagement rollers 151a includes a circumferential groove 403 rather than the smooth cylindrical surface 331. As such, the circumferential knife edge 329 of the first engagement roller 319 can cooperate with the circumferential groove 403 of the second engagement roller 401 to form the break line 333.

Figure 5:
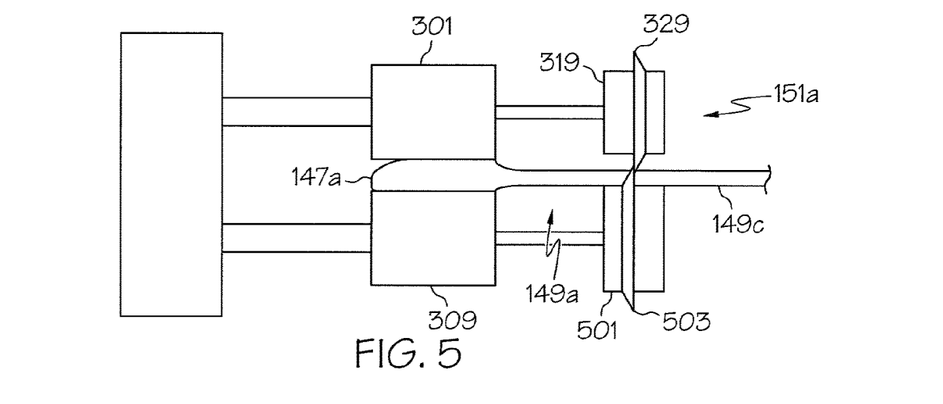
FIG. 5 illustrates yet another example of a pair of engagement rollers.

FIG. 5 illustrates another example arrangement of the edge rollers and the engagement rollers. While one side is illustrated and described with respect to FIG. 5, the opposite side may appear as a mirror image of the first side. As shown, FIG. 5 is similar or identical to FIG. 3, however, a second engagement roller 501 of the first pair of engagement rollers 151a includes a second circumferential knife edge 503 rather than the smooth cylindrical surface 331. As such the circumferential knife edge 329 of the first engagement roller 319 can cooperate with the second circumferential knife edge 503 of the second engagement roller 501 to thin the first edge portion 149a or sever the first edge portion 149a from the central portion 149c.

Figure 6:
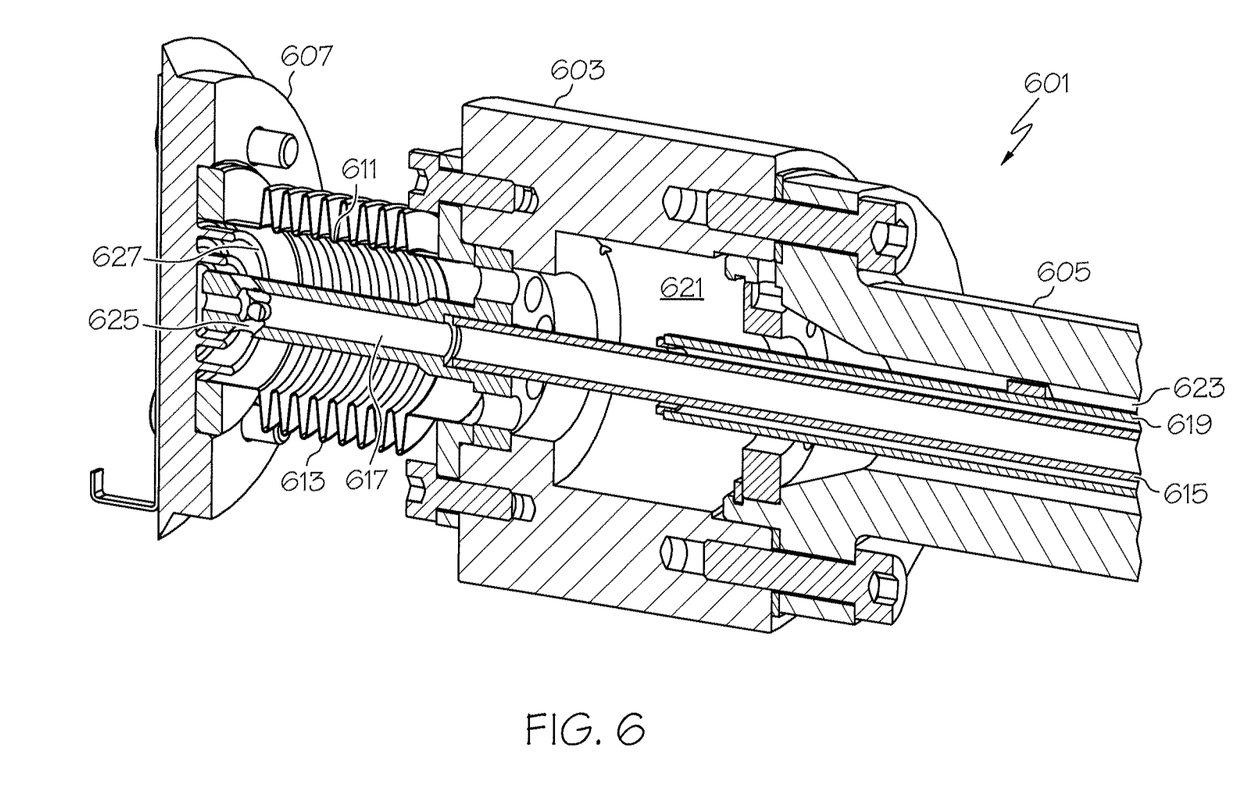
FIG. 6 is a sectional view of an example mechanism that flexibly couples an engagement roller to an edge roller.

FIG. 6 illustrates one example of a mechanism 601 that can be used to coaxially mount an engagement roller to an edge roller, for example, as shown in FIGS. 3-5. As shown, the mechanism 601 includes an edge roller 603 similar in design and operation to the edge rollers 301, 309 illustrated in FIGS. 3-5. The edge roller includes a shaft 605 that can be similar to the shaft 303, 311 used to substantially rigidly mount the edge roller to the motor 153a. The mechanism 601 further includes an engagement roller 607 with a circumferential knife edge 609 similar to the knife edge 329 illustrated in FIG. 3. Although not shown, the engagement roller may alternatively include a circumferential groove similar to the circumferential groove 403 illustrated in FIG. 4 or may be substantially smooth as indicated by the substantially smooth cylindrical surface 331 illustrated in FIG. 3.

The engagement roller 607 can be attached to the edge roller 603 by way of a flexible coupling 611 that can be protected from the high temperature environment associated with the forming apparatus by way of a thermal shield 613. The interior of the mechanism 601 can include a fluid cooling apparatus to facilitate cooling of the edge roller 603 and the engagement roller 607. An inner conduit can include a first segment 615 coupled to a second segment 617. The first segment 615 can be designed to extend through an outer conduit 619.

The outer conduit 619 can be designed to cool the edge roller 603. For example, air can be pumped in the area between the outer conduit 619 and the first segment 615 to enter the chamber 621 defined within the edge roller 603. Heat transfer can then pull heat from the edge roller 603 to the air within the chamber 621. The pressurized air then travels back through the shaft 605 in an area defined between a bore hole 623 of the shaft 605 and the outer conduit 619 to exit the mechanism 601.

The inner conduit can also be designed to cool the engagement roller 607. Air can be passed through the inner conduit until to exit at the end 625. The air can encounter a heat exchanger, such as the illustrated circumferential fins 627 to facilitate heat transfer from the engagement roller 607 to the air within the flexible coupling 611. The pressurized heated air can then pass back through the flexible coupling 611, through the chamber 621 of the edge roller 603 and out the bore hole 623 of the shaft. In operation, the thermal shield 513 can keep the surface temperature high enough to ensure minimal heat transfer by radiation with the glass while the fluid cooling apparatus can maintain the other components of the mechanism 601 sufficiently low to prevent thermal failure.

Figure 7:
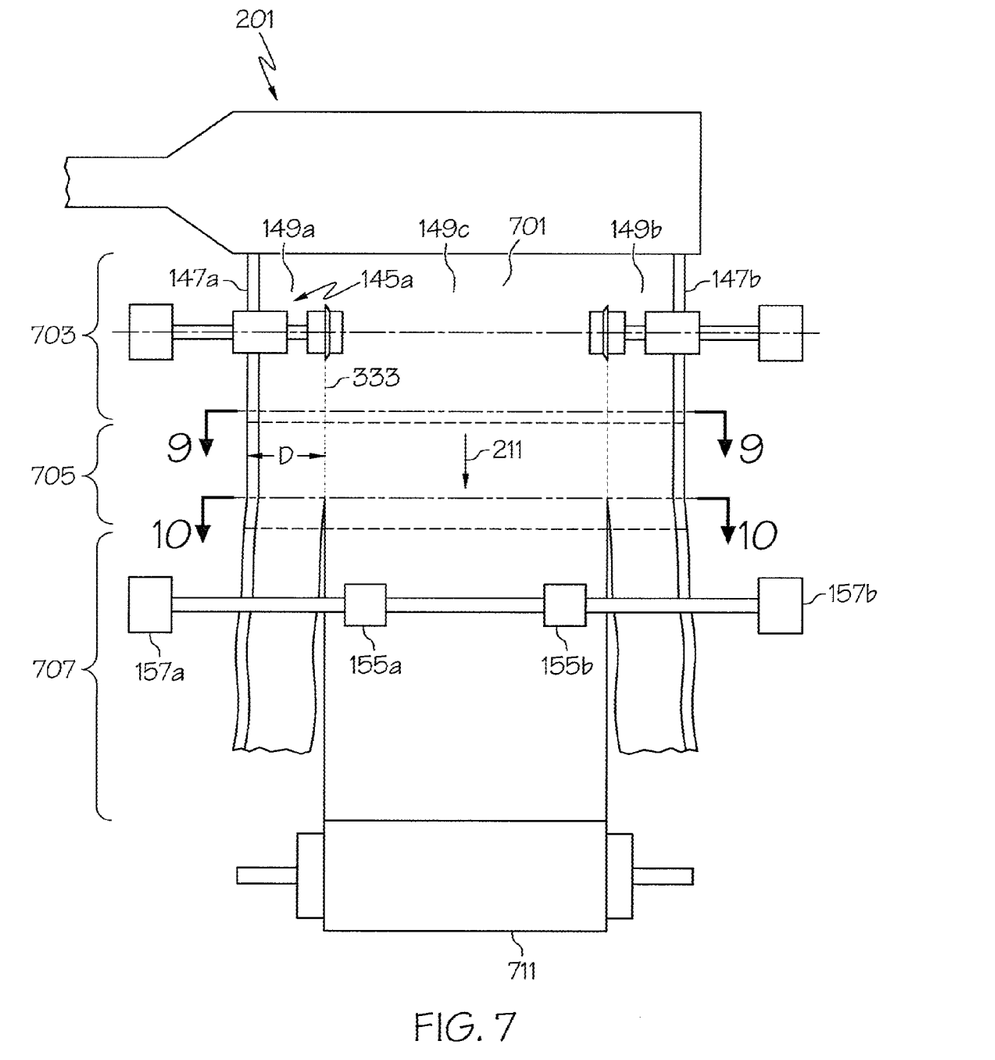
FIG. 7 illustrates one method of fusion drawing a glass ribbon from a forming wedge.

Fusion draw methods will now be described with respect to FIGS. 7-15. FIGS. 7-12 illustrate methods involving thinning the edge portion 149a, 149b. Referring to FIG. 2, the method includes the steps of flowing molten glass over the pair of downwardly inclined forming surface portions 207, 209 of the forming wedge 201, wherein the downwardly inclined forming surface portions converge along the downstream direction 211 to form the root 213. As shown in FIG. 7, the glass ribbon 701 is drawn from the root 213 into a viscous zone 703 wherein the glass ribbon 701 has the pair of opposed edge portions 149a, 149b and the central portion 149c laterally spanning between the opposed edge portions 149a, 149b. The outer end of each opposed edge portion includes the edge bead 147a, 147b. As shown in FIG. 9, the thickness $T_1$ of the edge beads 147a, 147b is greater than a thickness $T_2$ of the central portion 149c.

The method can further include the step of thinning each opposed edge portion 149a, 149b within the viscous zone 703. Referring to FIG. 7, the step of thinning forms the break line 333 extending in the downstream direction 211 and spaced a lateral distance "D" away from the outer end 901 of the corresponding edge portion 149a, 149b. As further illustrated in FIG. 9, a thickness $T_3$ of the glass ribbon at the break line 333 is less than the thickness $T_2$ of the central portion 149c of the glass ribbon. Thinning can be achieved by a wide variety of structural configurations. For example, thinning can be achieved with a pair of engagement rollers as shown in FIGS. 3-5.

Referring back to FIG. 7, the method then includes the step of drawing the glass ribbon 701 from the viscous zone 703 to a setting zone 705. In the setting zone, the glass ribbon is set from a viscous state to an elastic state with the desired profile. The method then includes the step of drawing the glass ribbon 701 from the setting zone 705 to an elastic zone 707. Once in the elastic zone, the glass ribbon may be deformed, within limits, without permanently changing the profile of the glass ribbon. The method then includes the step of breaking away each opposed edge portion 149a, 149b from the central portion 149c at the break line 333 sometime during or after the glass ribbon is drawn into the setting zone 705 from the viscous zone 703. As shown, in one example, breaking away can occur in the setting zone 705 although breaking away can alternatively occur in the elastic zone 707.

Figure 10:
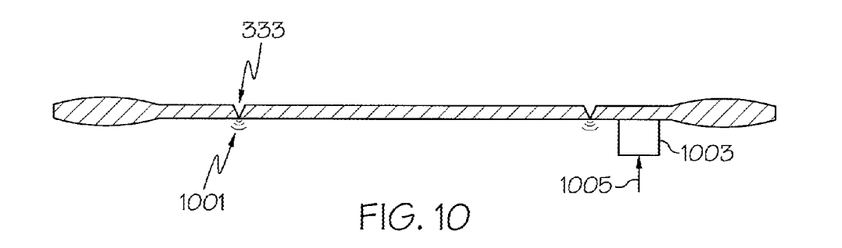
FIG. 10 is a sectional view along line 10-10 of FIGS. 7 and 8 demonstrating methods of removing the edge portion from the central portion of the glass ribbon.

The step of breaking away the edge portions can be achieved in a wide variety of ways. For example, as shown in FIG. 10, breaking away can occur spontaneously as indicated by reference number 1001. Spontaneous breaking can naturally occur do thermal differences between the edge portions and the central portion. Indeed, the break line 333 can act as a stress concentrator. As the glass begins to set within setting zone 705, increased stresses can occur at the reduce thickness region of the break line 333 until fracture is achieved spontaneously.

FIG. 10 also demonstrates an example where breaking away can be achieved by contact with an object 1003 that provides force in a direction 1005 to break away the edge portion from the central portion. In one example, the object may comprise a wedge, wherein the edge portion ramps along the wedge until the force is great enough to fracture the edge portion along the break line 333.

Figure 11:
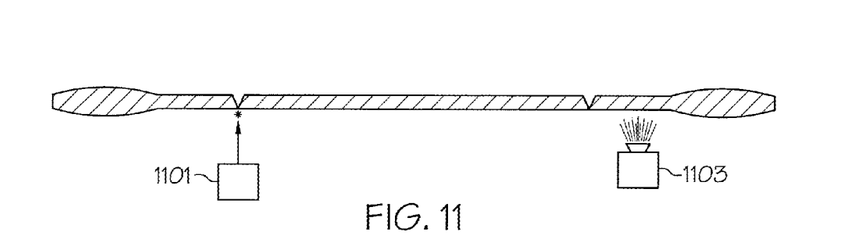
FIG. 11 is a sectional view along line 10-10 of FIGS. 7 and 8 demonstrating further methods of removing the edge portion from the central portion of the glass ribbon.
Figure 12:
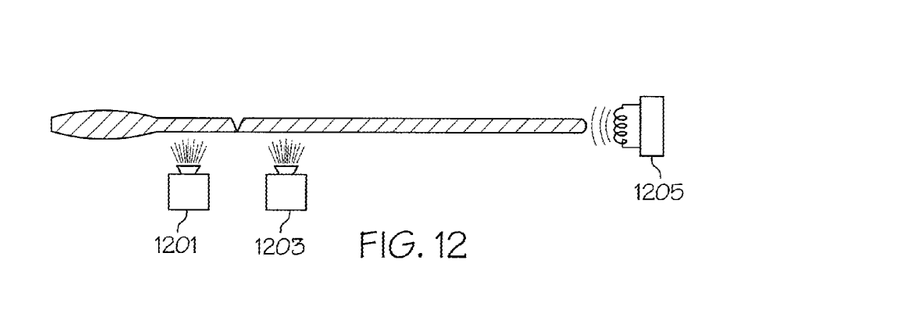
FIG. 12 is a sectional view along line 10-10 of FIGS. 7 and 8 demonstrating another method of removing the edge portion from the central portion of the glass ribbon and a method of healing an edge of the central portion.

FIG. 11 illustrates another example, wherein the reduced thickness portion is melted or broken away by way of a laser 1101. FIG. 11 also demonstrates breaking away along the break line by way of a heating or cooling device 1103 that can facilitate a greater temperature differential between the edge portion and the central portion. In one example the device 1103 can comprise a burner, laser, blower, liquid dispenser or other device designed to create thermal shock to increase stress along the break line to encourage separation along the break line. In another example, a blower may be provided, wherein a force provided by the blower tends to bend the edge portion to fracture the edge portion along the break line 333. FIG. 12 also shows heating or cooling devices 1201, 1203. In one example, the first device 1201 can comprise a heating device while the second device 1203 can comprise a cooling device. The temperature differential can further concentrate stress along the break line to facilitate separation of the edge portion from the central portion.

FIG. 12 further illustrates an optional step of healing a severed end of the central portion. If carried out, healing may be achieved by heating the edge with a heater 1205 or burner to remove imperfections in the end of the edge portion.

Turning back to FIG. 7, the method can further comprise the step of working each edge bead 147a with a corresponding pair of edge rollers 145a engaging the respective edge bead within the viscous zone. As shown in FIG. 7, the engagement rollers that can be coaxially aligned along the same rotational axis as the corresponding pair of edge rollers. As such, the step of working each edge bead can both conducted at substantially the same downstream distance from the root of the forming wedge.

FIG. 7 further illustrates that the glass ribbon 701 can be drawn by the drive rollers 155a, 155b driven by the motors 157a, 157b. The drive rollers 155a, 155b can engage the central portion 149c within the elastic zone 707 such that engagement does not permanently deform the central portion 149c of the glass. The drive rollers can control the rate at which the glass ribbon is drawn from the forming wedge, thereby controlling the thickness of the glass ribbon.

Optionally, the central portion 149c of the glass ribbon 701 can be coiled into a spool 711 of glass ribbon. The spool of glass ribbon can thereafter be shipped or otherwise easily transported to another location to cut into individual glass sheets. Removal of the edge portions allows for the central portion of the glass ribbon to be easily coiled onto the spool without undue stress that may otherwise be caused by the edge beads. Although not shown, in further examples, a traveling anvil machine or other cutting device may be provided within the elastic zone to cut the individual sheets as the sheets are drawn from the apparatus.

Figure 8:
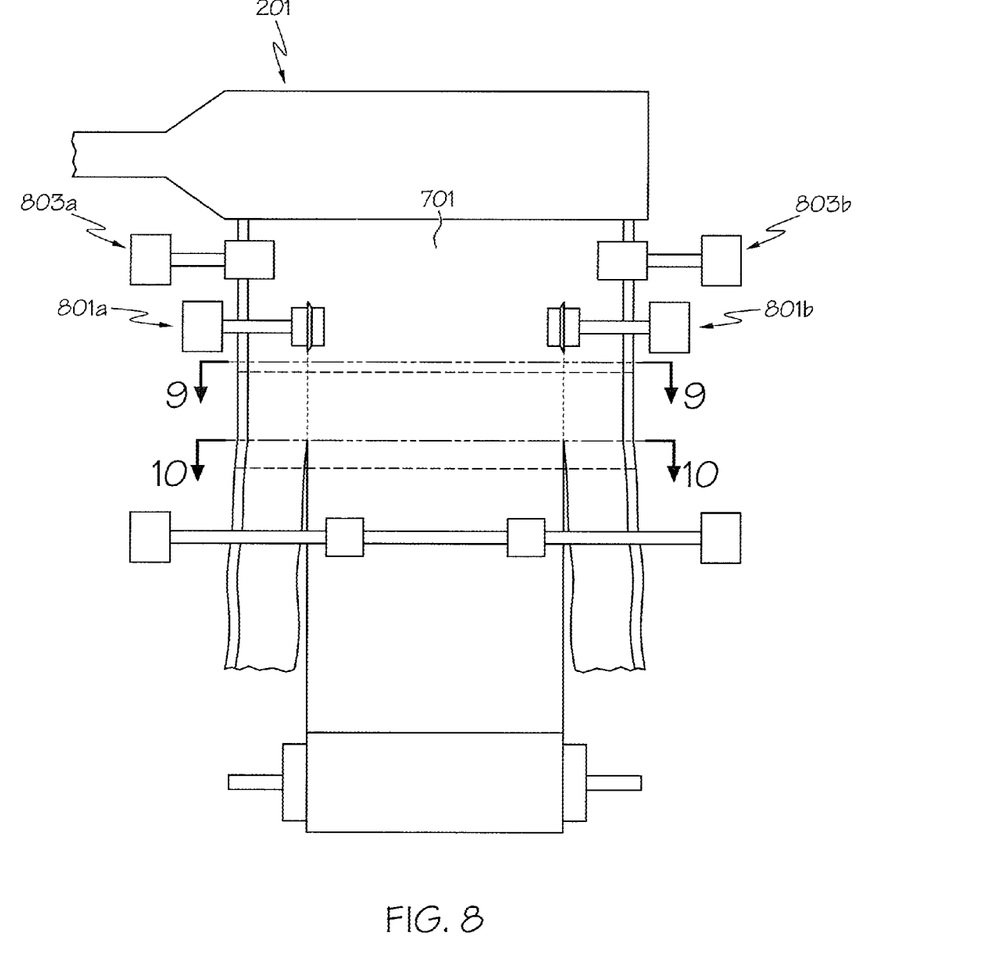
FIG. 8 illustrates another method of fusion drawing a glass ribbon from a forming wedge.
Figure 9:
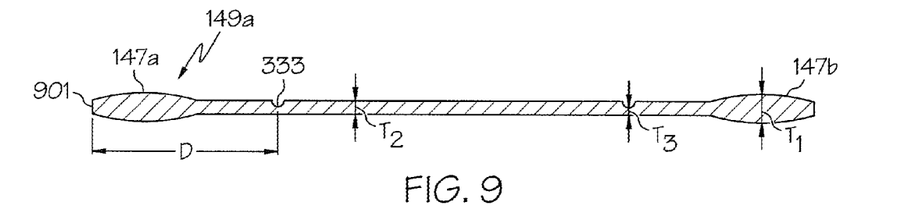
FIG. 9 is a sectional view along line 9-9 of FIGS. 7 and 8.

FIG. 8 illustrates a similar arrangement of the apparatus shown in FIG. 7 except that the step of thinning is conducted farther downstream from the root than where the corresponding pairs of edge rollers work the corresponding edge beads. Such a configuration may be desirable for easy retrofitting of existing equipment that already has the edge rollers in place. In such an arrangement, thinning devices 801a, 801b may be provided that are independent and distinct from the edge roller devices 803a, 803b. Alternatively, as shown in FIG. 7, coaxial alignment can be provided to raise the thinning location, thereby requiring less pressure to form the break line when compared to the arrangement illustrated in FIG. 8.

Figure 13:
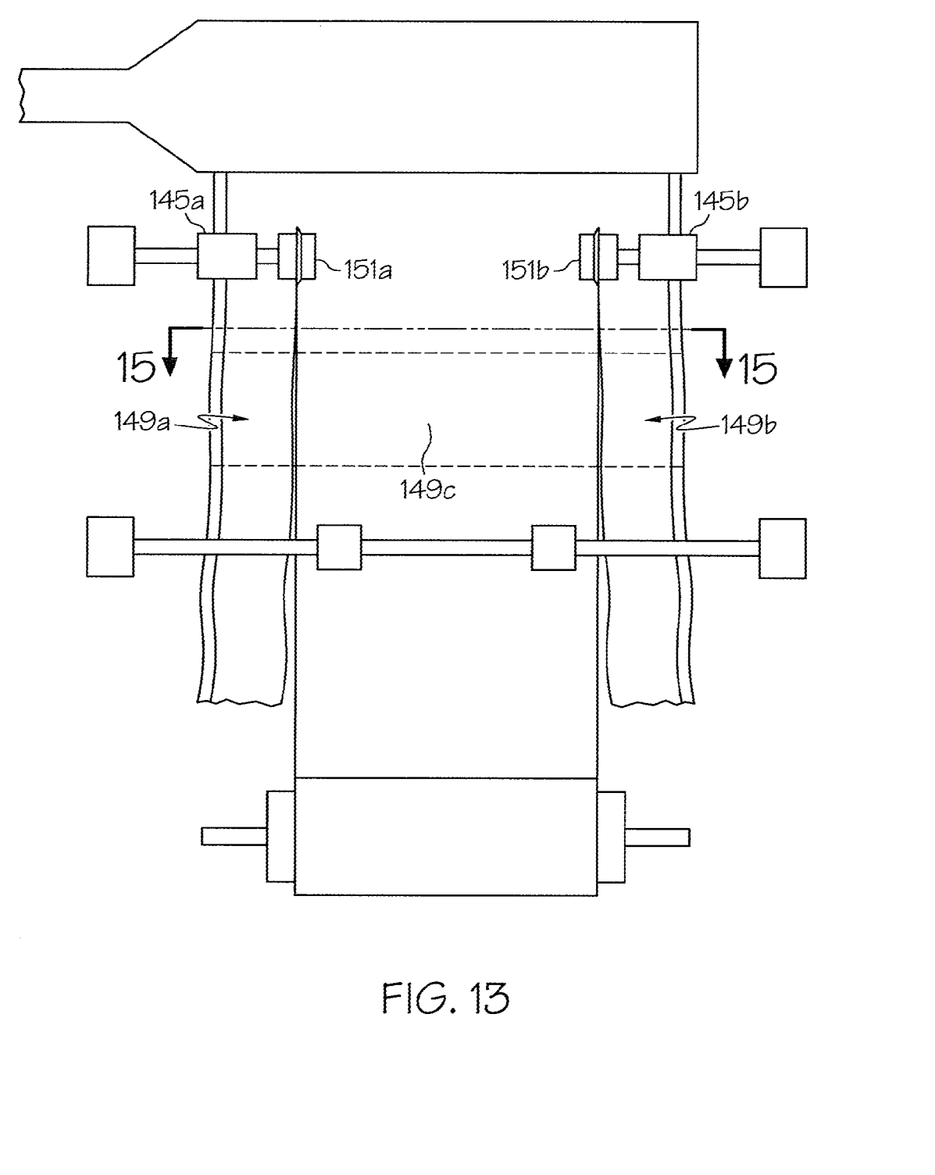
FIG. 13 illustrates yet another method of fusion drawing a glass ribbon from a forming wedge.
Figure 14:
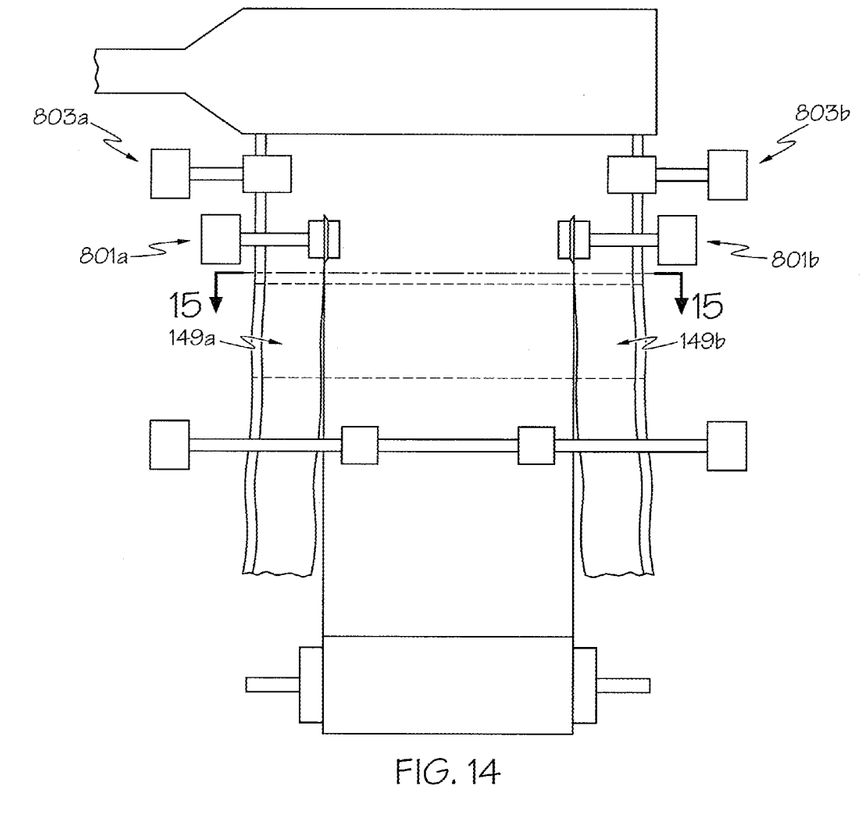
FIG. 14 illustrates still another method of fusion drawing a glass ribbon from a forming wedge.
Figure 15:
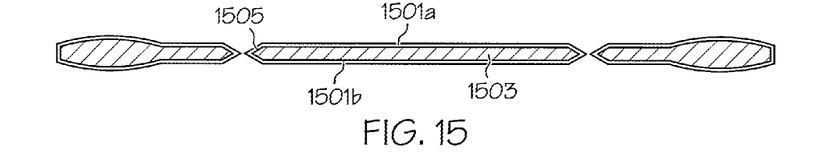
FIG. 15 is a sectional view along line 15-15 of FIGS. 13 and 14.

FIGS. 13 and 14 illustrate methods similar to FIGS. 7 and 8, respectively. However, the methods illustrated in FIGS. 13 and 14 sever the edge portions 149a, 149b from the central portion 149c without a thinning step for subsequent breaking along the break line 333 as described above. The method can be conducted with the various configurations discussed above with the exception that a greater force is applied to completely sever the glass ribbon, rather than merely thinning the glass ribbon. Completely severing the glass ribbon may be desirable, for example with laminate glass ribbon sheets that have two layers 1501a, 1501b that are positioned on opposite sides of a core layer 1503 as shown in FIG. 15. Completely severing allows sealing of the ends of the core layer 1503 by the two layers 1501a, 1501b as demonstrated by the integrated region 1505.

Thinning, rather than completely severing may also be provided in further examples where the edge bead is desired to be left in tact throughout the viscous zone 703. Indeed, thinning rather than severing allows the edge portion to help control the width and shape of the glass ribbon until the glass ribbon reaches the setting zone and/or the elastic zone where the support provided by the edge portion is no longer required.

Whether or not thinned or severed, the edge portions can be removed before reaching temperatures where stresses may otherwise build up in the glass ribbon and/or before the process where the thin ribbon is coiled into a spool of glass ribbon.

It will be apparent to those skilled in the art that various modifications and variations can be made without departing from the spirit and scope of the claimed invention.

What is claimed is:

1. A fusion draw method comprising the steps of:
   (I) flowing molten glass over a pair of downwardly inclined forming surface portions of a forming wedge, the downwardly inclined forming surface portions converging along a downstream direction to form a root;
   (II) drawing a glass ribbon from the root into a viscous zone, wherein the glass ribbon has a pair of opposed edge portions and a central portion in a viscous state laterally spanning between the opposed edge portions, and an outer end of each opposed edge portion including an edge bead with a thickness that is greater than a thickness of the central portion;
   (III) severing the edge portions from the central portion within the viscous zone prior to the central portion transitioning from the viscous state to an elastic state; then
   (IV) drawing the central portion of the glass ribbon from the viscous zone into a setting zone, wherein the central portion transitions from the viscous state to the elastic state in the setting zone; and then
   (V) drawing the central portion of the glass ribbon from the setting zone to an elastic zone, wherein the central portion is in the elastic state in the elastic zone.

2. The method according to claim 1, wherein the edge portions are severed from the central portion with at least one corresponding engagement roller associated with each edge portion.

3. The method according to claim 1, wherein the edge portions are each severed from the central portion with a corresponding pair of engagement rollers associated with each edge portion.

4. The method according to claim 3, wherein at least one of the pair of engagement rollers includes a circumferential knife edge that severs the corresponding edge portion from the central portion.

5. The method according to claim 3, wherein each of the pair of engagement rollers includes a circumferential knife edge that cooperate to sever the corresponding edge portion from the central portion.

6. The method according to claim 1, further comprising the step of working each edge bead with a corresponding pair of edge rollers engaging the respective edge bead within the viscous zone.

7. The method according to claim 6, wherein each of the edge portions are severed from the central portion with at least one corresponding engagement roller that is coaxially aligned along the same rotational axis as the corresponding pair of edge rollers.

8. The method according to claim 6, wherein step (III) and the step of working each edge bead are both conducted at substantially the same downstream distance from the root of the forming wedge.

9. The method according to claim 6, wherein step (III) is conducted farther downstream from the root than where the corresponding pairs of edge rollers work the corresponding edge beads.

* * * * *